United States Patent
Zhao et al.

(10) Patent No.: US 7,898,994 B2
(45) Date of Patent: Mar. 1, 2011

(54) POWER SAVING IN MULTI-PROCESSOR DEVICE

(75) Inventors: Wen Zhao, Cupertino, CA (US); David Kammer, Seattle, WA (US); Mark T. Davis, Mill Valley, CA (US); Arun G. Mathias, Sunnyvale, CA (US); Isabel Ge Mahe, Los Altos, CA (US); Bennett Chan, Saratoga, CA (US); Alex Yee Kit Ho, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1120 days.

(21) Appl. No.: 11/634,366

(22) Filed: Dec. 5, 2006

(65) Prior Publication Data

US 2007/0140199 A1 Jun. 21, 2007

Related U.S. Application Data

(63) Continuation-in-part of application No. 10/759,597, filed on Jan. 15, 2004, now Pat. No. 7,620,407, which is a continuation-in-part of application No. 11/155,387, filed on Jun. 16, 2005, now Pat. No. 7,248,146, which is a continuation of application No. 10/083,044, filed on Feb. 25, 2002, now Pat. No. 6,943,667.

(60) Provisional application No. 60/455,178, filed on Mar. 16, 2003.

(51) Int. Cl.
*G08C 17/00* (2006.01)
*H04M 1/00* (2006.01)
*H04B 1/16* (2006.01)

(52) U.S. Cl. ............... 370/311; 455/574; 455/343.2
(58) Field of Classification Search ............ 455/572, 455/574, 343.2, 343.3, 343.4, 343.5; 370/311
See application file for complete search history.

(56) References Cited

U.S. PATENT DOCUMENTS

| | | | |
|---|---|---|---|
| 5,386,435 A | 1/1995 | Cooper et al. | |
| 5,566,357 A | 10/1996 | Holcman | |
| 6,289,464 B1 * | 9/2001 | Wecker et al. | 713/300 |
| 6,443,891 B1 | 9/2002 | Grevious | |
| 6,457,134 B1 | 9/2002 | Lemke et al. | |
| 6,460,143 B1 * | 10/2002 | Howard et al. | 713/323 |
| 6,523,073 B1 | 2/2003 | Kammer et al. | |
| 6,529,748 B1 * | 3/2003 | Bruner | 455/574 |
| 6,567,921 B1 * | 5/2003 | Guziak | 713/322 |
| 6,600,739 B1 * | 7/2003 | Evans et al. | 370/362 |
| 6,671,660 B2 | 12/2003 | Freed | |
| 6,681,244 B1 | 1/2004 | Cross et al. | |
| 6,708,280 B1 | 3/2004 | Tate et al. | |
| 6,721,892 B1 | 4/2004 | Osborn et al. | |
| 6,854,066 B1 | 2/2005 | LeFevre et al. | |
| 6,943,667 B1 | 9/2005 | Kammer et al. | |
| 6,976,217 B1 | 12/2005 | Vertaschitsch et al. | |
| 7,634,670 B2 * | 12/2009 | Nago et al. | 713/300 |

(Continued)

*Primary Examiner* — George Eng
*Assistant Examiner* — Christopher M Brandt
(74) *Attorney, Agent, or Firm* — Foley & Lardner LLP

(57) ABSTRACT

A mobile computing device comprises a first microprocessor having a sleep mode and a wake mode and a second microprocessor configured for wireless communication. A communication port is configured to communicate data from the second processor to the first processor, wherein the second processor is configured to provide a wake signal to the first microprocessor and the first microprocessor is configured to open the communication port in response to the wake signal and to receive data from the second microprocessor through the communication port.

15 Claims, 12 Drawing Sheets

U.S. PATENT DOCUMENTS

| | | |
|---|---|---|
| 2001/0034246 A1* | 10/2001 | Hutchison et al. ............ 455/557 |
| 2001/0041587 A1* | 11/2001 | Gushiken ...................... 455/556 |
| 2002/0132636 A1* | 9/2002 | Stockhusen ................... 455/553 |
| 2003/0063601 A1* | 4/2003 | Niida et al. ................... 370/360 |
| 2003/0104836 A1* | 6/2003 | Shinohara ..................... 455/557 |
| 2004/0003021 A1* | 1/2004 | Safford et al. ................ 709/104 |
| 2006/0194549 A1* | 8/2006 | Janik et al. ...................... 455/73 |
| 2008/0005591 A1* | 1/2008 | Trautman et al. ............. 713/300 |

* cited by examiner

POWER SAVING IN MULTI-PROCESSOR DEVICE

CROSS-REFERENCE TO RELATED PATENT APPLICATIONS

This application is a continuation-in-part of application Ser. No. 11/155,387 filed Jun. 16, 2005, which is a continuation of application Ser. No. 10/083,044 filed Feb. 25, 2002 and issued Sep. 13, 2005 as U.S. Pat. No. 6,943,667. This application is a continuation-in-part of application Ser. No. 10/759,597 filed Jan. 15, 2004, which claims the benefit of U.S. Provisional Application No. 60/455,178 filed Mar. 16, 2003.

BACKGROUND

Mobile computing devices are typically powered by batteries. Consumers who purchase mobile computing devices look for a device that can operate a long period of time without needing to recharge the battery. Therefore, there is a need to improve the power consumption of mobile computing devices.

Some mobile computing devices, such as smart phones, use two microprocessors: one for radio communication and one for running a variety of applications. Both microprocessors consume power, even though one microprocessor may be idle while the other microprocessor is running.

Accordingly, there is a need for improved systems and methods for reducing power consumption in a multi-processor mobile computing device. Further, there is a need for reducing power consumption in the communication of data between a plurality of processors in a multi-processor mobile computing device. Further still, there is a need for reducing power consumption in a mobile computing device operating over a wireless communication link having a server time-out feature.

The teachings herein extend to those embodiments which are within the scope of the appended claims, regardless of whether they accomplish one or more of the above-mentioned needs.

DETAILED DESCRIPTION OF THE EXEMPLARY EMBODIMENTS

Application Ser. No. 11/155,387 filed Jun. 16, 2005, application Ser. No. 10/083,044 filed Feb. 25, 2002 and issued Sep. 13, 2005 as U.S. Pat. No. 6,943,667, application Ser. No. 10/759,597 filed Jan. 15, 2004, U.S. Provisional application No. 60/455,178 filed Mar. 16, 2003, and application Ser. No. 11/469,374 filed Aug. 31, 2006 are all incorporated by reference herein in their entirety.

Figure 1:
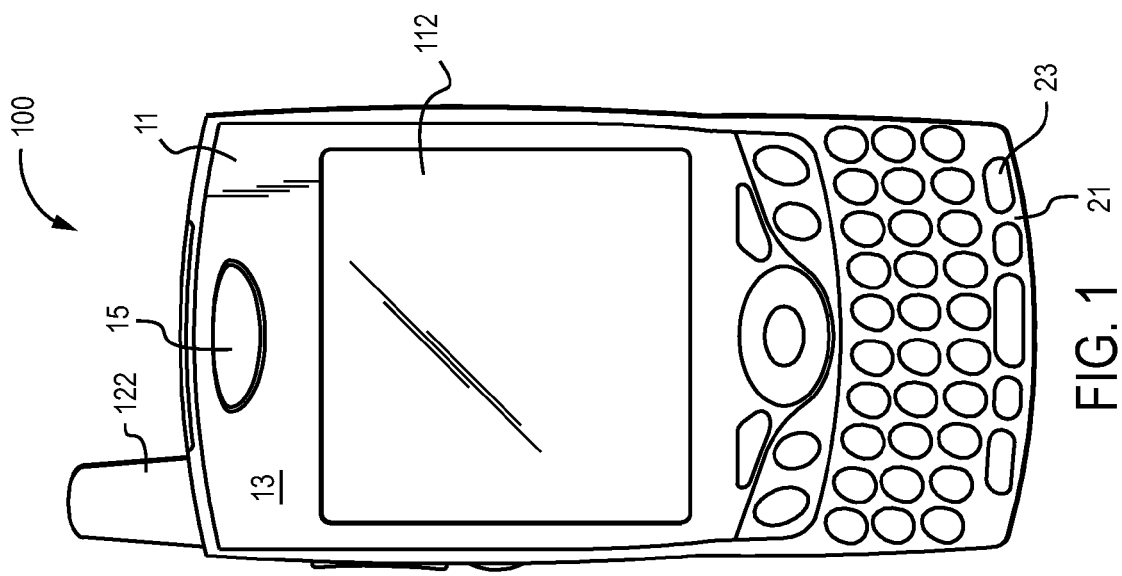
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer) or other electronic devices (e.g., a desktop personal computer, home or car audio system, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 2:
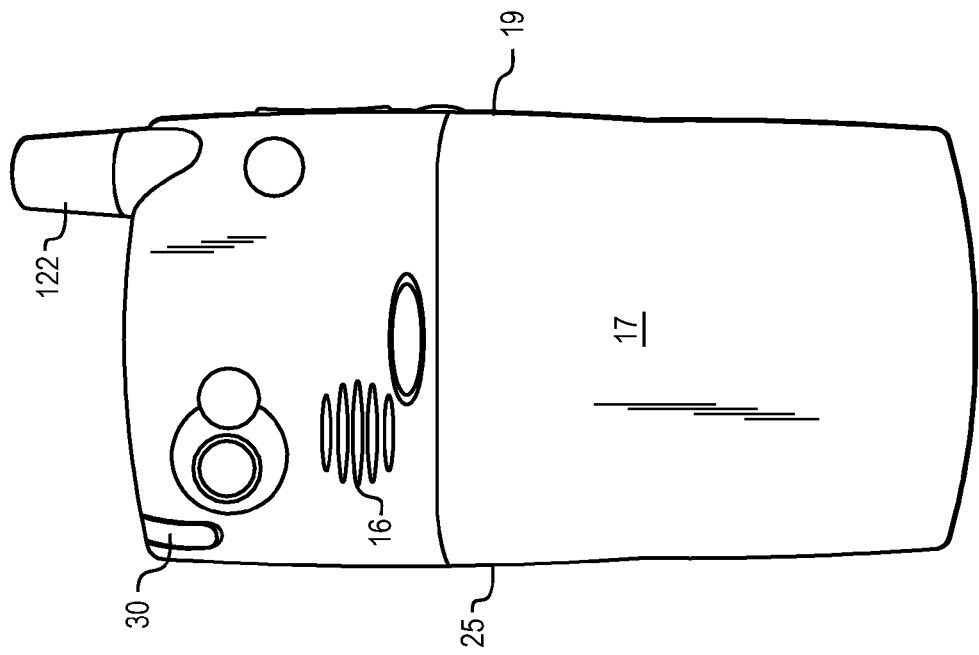
FIG. 2 is a back view of a mobile computing device, according to an exemplary embodiment.

Earpiece speaker 15 may be a speaker configured to provide audio output with a volume suitable for a user placing earpiece speaker 15 against or near the ear. Loudspeaker 16 is an electro-acoustic transducer that converts electrical signals into sounds loud enough to be heard at a distance. Loudspeaker 16 can be a used for a speakerphone functionality. Device 100 comprises a housing 11 having a front side 13 and a back side 17 (FIG. 2). In alternative embodiments, display 112, user input device 110, earpiece speaker 15 and loudspeaker 16 may each be positioned anywhere on front side 13, back side 17 or the edges therebetween.

Mobile computing device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 3:
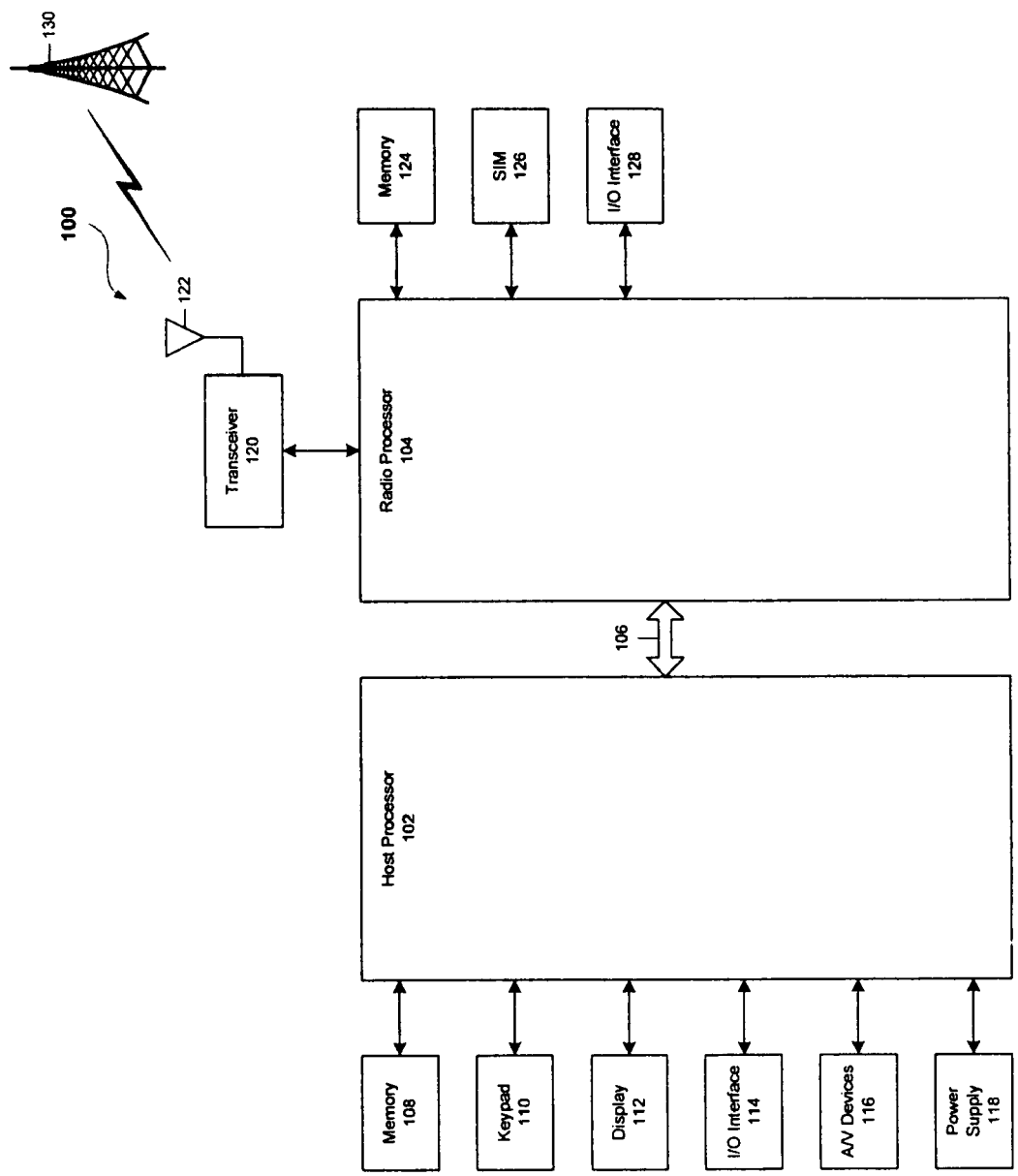
FIG. 3 is a block diagram of the mobile computing device of FIGS. 1 and 2, according to an exemplary embodiment.

As shown in the embodiment of FIG. 3, mobile computing device 100 may comprise a dual processor architecture including a host processor 102 and a radio processor 104 (e.g., a base band processor). The host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for the mobile computing device 100. The radio processor 104 may be responsible for performing various voice and data communications operations for the mobile computing device 100 such as transmitting and receiving voice and data information over one or more wireless communications channels. Although embodiments of the dual processor architecture may be described as comprising the host processor 102 and the radio processor 104 for purposes of illustration, it is worthy to note that the dual processor architecture of the mobile computing device 100 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be arranged to provide processing or computing resources to the mobile computing device 100. For example, the host processor 102 may be responsible for executing various software programs such as application programs and system programs to provide computing and processing operations for the mobile computing device 100. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between the mobile computing device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Runtime Environment for Wireless (BREW) OS, JavaOS, a Wireless Application Protocol (WAP) OS, and so forth.

The mobile computing device 100 may comprise a memory 108 coupled to the host processor 102. In various embodiments, the memory 108 may be arranged to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The mobile computing device 100 may comprise a user input device 110 coupled to the host processor 102. User input device 110 may comprise, for example, a QWERTY key layout and an integrated number dial pad. The mobile computing device 100 also may comprise various keys, buttons, keypad, alphanumeric keypad, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, and so forth.

The host processor 102 may be coupled to a display 112. The display 112 may comprise any suitable visual interface for displaying content to a user of the mobile computing device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 116 that support A/V capability of the mobile computing device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 arranged to supply and manage power to the elements of the mobile computing device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a transceiver module 120 coupled to the radio processor 104. The transceiver module 120 may comprise one or more transceivers arranged to communicate using different types of protocols, communication ranges, operating power requirements, RF sub-bands, information types (e.g., voice or data), use scenarios, applications, and so forth. In various embodiments, the transceiver module 120 may comprise one or more transceivers arranged to support voice communication for a cellular radiotelephone system such as a GSM, UMTS, and/or CDMA system. The transceiver module 120 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, it is worthy to note that in various embodiments some portion or the entire transceiver module 120 may be included on the same integrated circuit as the radio processor 104. The embodiments are not limited in this context.

The mobile computing device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

The mobile computing device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, and so forth. The memory 124 may comprise, for example, flash memory and secure digital (SD) RAM. Although the memory 124 may be shown as being separate from and external to the radio processor 104 for purposes of illustration, it is worthy to note that in various embodiments some portion or the entire memory 124 may be included on the same integrated circuit as the radio processor 104.

The mobile computing device 100 may comprise a subscriber identity module (SIM) 126 coupled to the radio processor 104. The SIM 126 may comprise, for example, a removable or non-removable smart card arranged to encrypt voice and data transmissions and to store user-specific data for allowing a voice or data communications network to identify and authenticate the user. The SIM 126 also may store data such as personal settings specific to the user.

The mobile computing device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between the mobile computing device 100 and one or more external computer systems.

Figure 4:
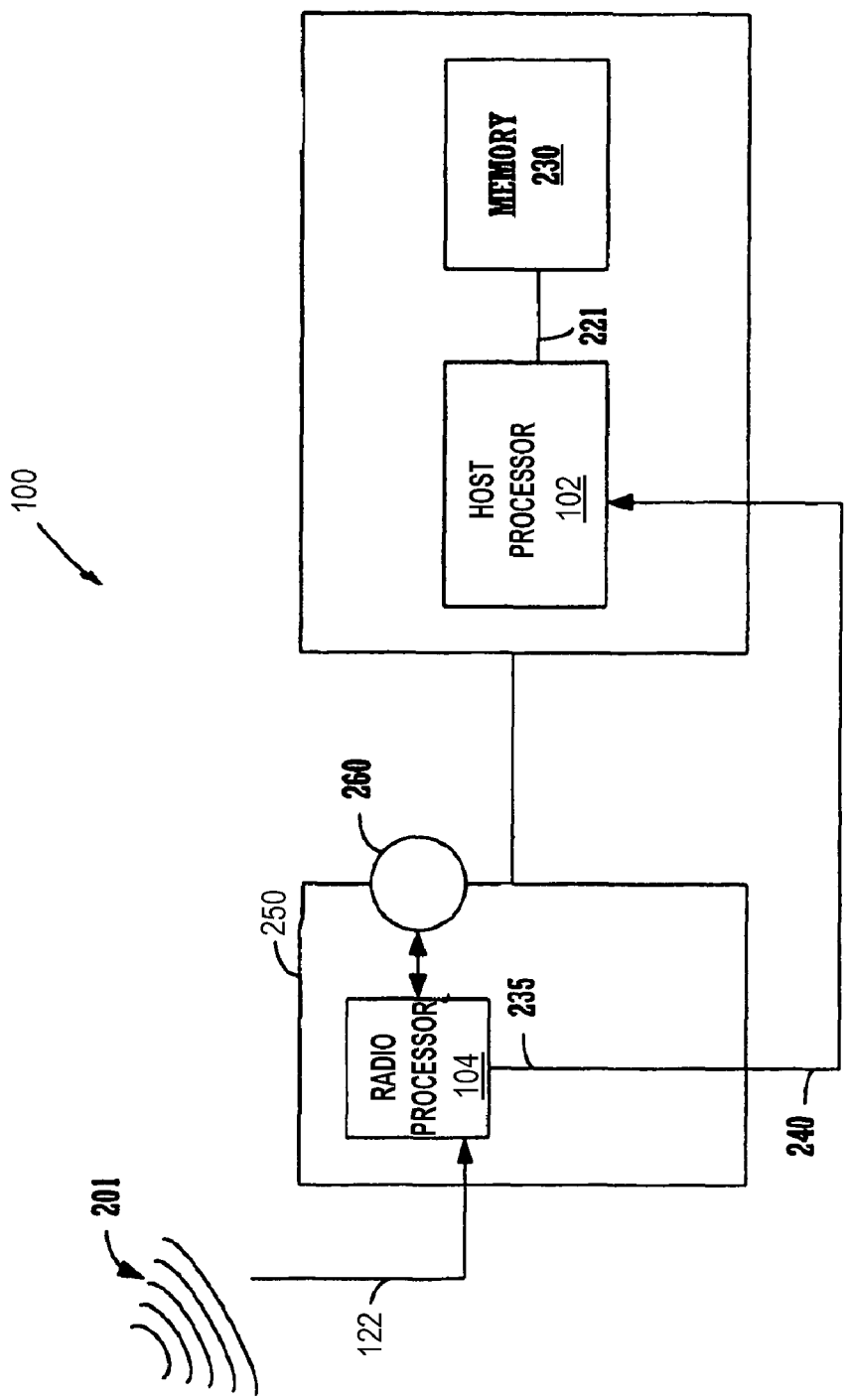
FIG. 4 is a block diagram illustrating a system and method for limiting power consumption, according to an exemplary embodiment.

Referring now to FIG. 4, an exemplary system and method for limiting power consumption will be described. In some embodiments herein, the process of limiting power consumption may be referred to as a "handshaking" feature, in which at least one of host processor 102 and radio processor 104 is configured to control the other from a wake to sleep or sleep to wake state. Handshaking may refer to the ability of two or more processors to sleep independent of each other, and may be provided in any of a number of embodiments, some of which will be described herein. It is advantageous to allow each processor to move to a sleep state when it has no tasks, even though the other processor is still processing tasks. Each processor is provided with the ability to wake the other when communication between the two is needed (e.g., via UART, USB or shared memory).

Host processor 102 can be placed in a sleep mode or a wake mode. In a sleep mode, host processor 102 is capable of performing certain activities such as keeping memory refreshed or periodically waking up; however, during the sleep mode host processor 102 does not perform to its full capability. Maintaining a microprocessor in a sleep mode is generally desired for energy conservation.

Radio circuit 250 comprises antenna 122, radio processor 104, and a communication port 260 (e.g., serial port, universal serial bus, universal asynchronous receiver transmitter, etc.). In one embodiment, radio circuit 250 may monitor wireless traffic received over antenna 122 while host microprocessor 102 is in the sleep mode. Radio circuit 250 continuously scans a set of defined frequencies (e.g., page scan in Bluetooth standard) for an in-bound signal.

A remote device (e.g., a transmitting electronic device, not shown) transmits a signal to mobile computing device 100. The transmitted signal may be an out of band signal requesting a connection. Radio circuit 250 scanning for in-bound signals detects signal 201 transmitted by the transmitting electronic device.

The signal transmitted by the transmitting electronic device requests a connection and may not contain user data. Antenna 122 coupled to radio processor 104 receives signal 201 (e.g., incoming connection request) and transmits an interaction to radio processor 104, where radio processor 104, having a certain processing capability, determines if the signal is a connection attempt. Radio processor 104 coupled to communication port 260, determines: a) if communication port 260 is closed; and b) if signal 201 is transmitted by a trusted device.

In case communication port 260 is closed and signal 201 is from a trusted device, radio processor 104 toggles an outside line 235, which is coupled to an interrupt mechanism (not shown), causing the generation of an interrupt signal. Generation of the interrupt signal may be done in accordance with a extension of the communication protocol (e.g., Bluetooth specification) which allows radio circuit 250 to select a line coupled to the interrupt mechanism and toggle the line if communication port 260 is closed. Accordingly, when communication port 260 is closed, the outside line is toggled and the interrupt mechanism generates an interrupt signal. The interrupt signal is then transmitted to host processor 102 via interrupt line 240 causing host processor 102 to wake up to its full operational capability. An interrupt vector including different communication protocols (e.g., Bluetooth, IR, etc.) resides in the operating system (not shown) of host processor 102. Host processor 102, responding to the interrupt signal, sends a command to its operating system to invoke an appropriate communication protocol (e.g., Bluetooth, IR, etc.). Accordingly, a communication protocol is invoked and causes communication port 260 to open and receive data signal 201.

If the port 260 was already open when the message was received, the interrupt signal is still generated to wake the host processor 102. Once wakened, it receives the message from the open port.

The interrupt signal wakes the host processor 102, which opens the communication port 260, and data information is received. Advantageously, the communication port can be shut down when not in use thereby saving power.

Figure 5:
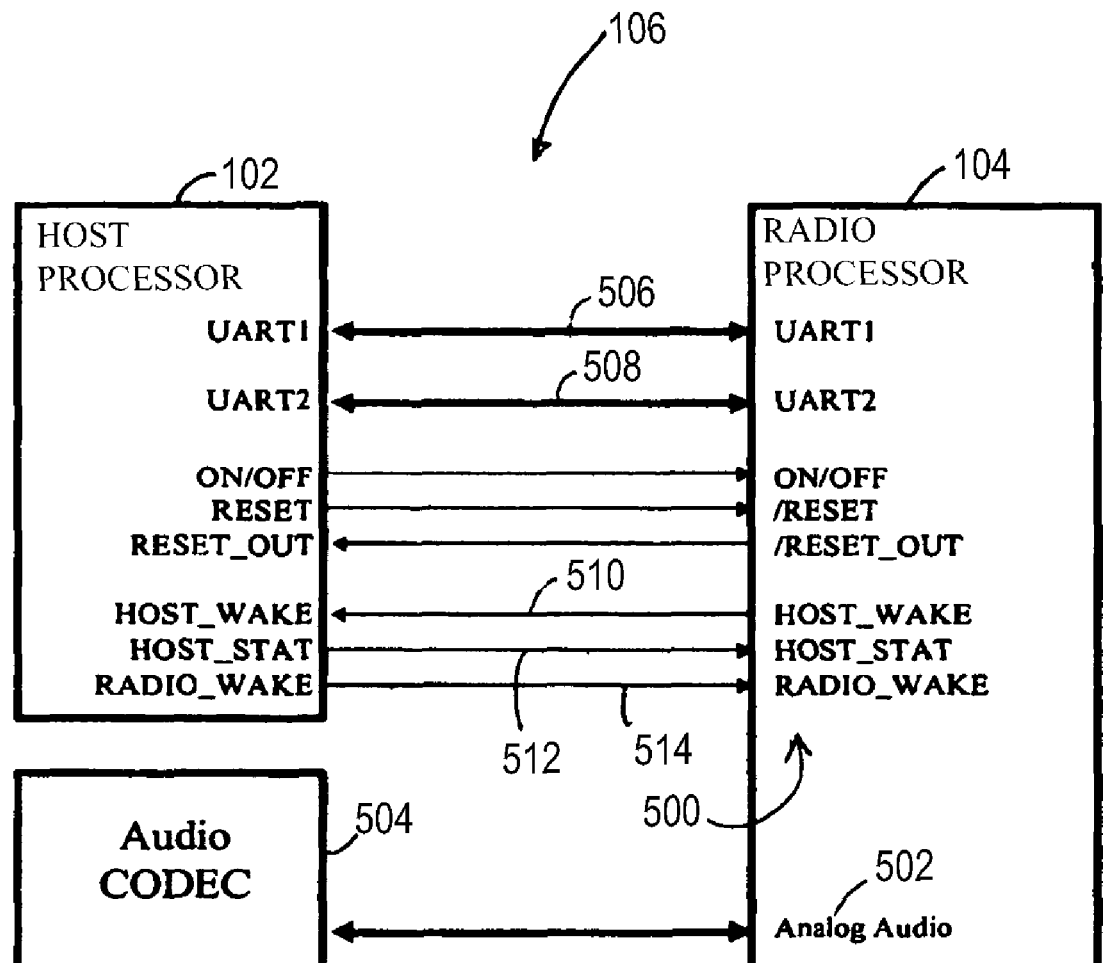
FIG. 5 is a schematic diagram illustrating communication lines between a plurality of processors, according to an exemplary embodiment.

Referring now to FIG. 5, another exemplary system and method for limiting power consumption will be described. FIG. 5 is a schematic diagram illustrating communication lines between a plurality of processors, according to an exemplary embodiment. As can be seen, a plurality of digital serial ports and control signals 500 of radio processor 104 are coupled to host processor 102. Analog audio signals 502 are coupled to audio CODEC 504 for routing to microphones, speakers, or host processor 102. In one exemplary embodiment, UART1 506 may be used for multiplexed control and data. UART2 508 may be used for debug information during development. In an alternative embodiment, UART1 506 may be used for command and diagnostics information and UART2 508 may be used for data calls.

In the system of FIG. 5, a plurality of signals are used to control power management functions between host processor 102 and radio processor 104.

RESET/ON-OFF    (ON/OFF,    RADIO_RESET~, RESET_OUT~)

ON/OFF—This active high input signal turns radio processor 104 on and off. A high level on this pin will turn on radio processor 104 and boot host processor 102. A low level on this pin will force radio processor 104 off immediately, rather than into a graceful shutdown. The graceful shutdown will be accomplished via a software command before the ON/OFF pin is driven low.

RADIO_RESET~—The active low input pin is the master reset for radio processor 104. This pin will need to be driven low and then high in order to accomplish a full radio reset.

RESET_OUT~—This signal is an output from a CDMA radio processor 104, and indicates that CDMA radio processor 104 is in RESET and requires initialization.

HANDSHAKE    (HOST_WAKE,    RADIO_WAKE, HOST_ STATUS)

HOST_WAKE 510—Radio processor 104 drives this active high signal to host processor 102 when it wants to wake up host processor 102 to send a message. In addition, when host processor 102 wakes up radio processor 104, this signal is used to acknowledge the RADIO_WAKE signal from host processor 102. This signal should remain high as long as messages are pending from radio processor 104 or as long as host processor 102 has requested radio processor 104 to be turned on.

RADIO_WAKE 514—Host processor 102 drives this active high signal to radio processor 104 when it wants to wake up radio processor 104 to send a message. In addition, when radio processor 104 wakes up host processor 102, this signal is used to acknowledge the HOST_WAKE signal from radio processor 104. This signal should remain high as long as messages are pending from host processor 102 or as long as radio processor 104 has requested host processor 102 to be turned on.

HOST_STATUS 512—This signal is used to inform radio processor 104 of the sleep status of host processor 102. When this signal is low, host processor 102 is asleep, and radio processor 104 should not send low-priority messages. When the signal is high, host processor 102 is awake, and radio processor 104 is free to send message of any priority to host processor 102.

POWER SUPPLY (VCC_RADIO, VCC_BB, BVATT, GROUND)

VCC_RADIO—This signal is provided by radio processor 104 and is connected to the I/O voltage of the baseband IC. It will be used by the Duo board to determine when the baseband chip has been powered up and to supply voltage to any interface circuitry, if required.

VCC_BB—This is a power input to radio processor 104 to be used to derive the various baseband voltages. Rather than use a higher voltage VBATT, this input is a lower voltage (3.2 V typically) to allow for better power efficiency.

VBATT—This is main battery voltage of the system, ranging from approximately 3.4 to 4.2 volts.

GROUND—This is the main ground connection in the system. 4 pins are used for power return, and 2 are used for signal ground.

Handshaking functions can be provided in any of a variety of methods. Exemplary methods are set forth below:

Power On—GSM
1. User powers on device 10.
2. VDDS_OUT is asserted. Host processor 102 cannot assert MODULE_WAKE until VDSS_OUT is high, in this exemplary embodiment.
3. Radio processor 104 will come out of reset about 5 ms after VDDS_OUT is high. Radio processor 104 will then drive HOST_WAKE after initialization is complete and it sees MODULE_WAKE.
4. Radio processor 104 sends message to host processor 102 (1$^{st}$ message sent by the modem) to indicate that radio processor 104 is powered up.

Power On—CDMA
1. User powers on the module.
2. VDDS_OUT is asserted. Host processor 102 cannot assert MODULE_WAKE until VDDS_OUT is high, in this exemplary embodiment.
3. Radio processor 104 will come out of reset about 5 ms after VDDS_OUT is high. Radio processor 104 will then drive HOST_WAKE after initialization is complete and it sees MODULE_WAKE.
4. Host processor 102 sends Enable_Autonomous_Messaging message to radio processor 104 (1$^{st}$ message sent by host processor 102). This message enables radio processor 104 to send autonomous messages to host processor 102, and also acts as a soft handshake to signal to radio processor 104 that host acknowledges that modem is powered up.
5. Radio processor 104 de-asserts ~RESET_OUT after receiving the message.

Power Off
1. User powers down the module.
2. CPU sends graceful deregistration commands to radio processor 104 and waits for confirmation response.
3. CPU de-asserts ON/OFF which immediately shuts off power to radio processor 104.

Host Sleep/Wake Status
The CDMA radio processor 104 needs to know host's sleep mode status to suppress low priority messages (GSM radio module does not). This is important to conserve host's power by shutting down the UARTs. When host goes to sleep, it will de-assert the HOST_STATUS signal, which will result in an interrupt to radio processor 104. Modem will suppress all low priority control messages until this signal is asserted.

Host Sends Data to Modem
1. Host asserts MODULE_WAKE interrupt to signal to radio processor 104 that it wishes to initiate data transfer. Host UART is already enabled at this point.
2. Modem woke up if it was in sleep mode. TCXO, UART1 and UART2 are enabled. Modem is ready to receive data. It asserts HOST_WAKE interrupt to signal to host processor 102 that it's ready to receive data.
3. Message transfer occurs. Multiple messages can be exchanged.
4. After the message has terminated, there is a short hysteresis period to prevent unnecessary toggling of either of the handshake signals.
5. Host de-asserts MODULE_WAKE interrupt since it has finished all the message transfer at this point. Modem however can still send messages to host processor 102. Modem will NOT sleep until MODULE_WAKE is de-asserted so host processor 102 de-asserts MODULE_WAKE when it is finished with its transmission.
6. Modem de-asserts HOST_WAKE interrupt if it also does not have any other messages to send. Note: The initiator (host in this case) does not have to terminate the communication first. Now since both MODULE_WAKE and HOST_WAKE are de-asserted, the communication channel is closed and UART clocks are disabled.
7. Both processors can enter into sleep state.

Modem Sends Data to Host
1. Modem asserts HOST_WAKE interrupt to signal to host processor 102 that it wishes to initiate data transfer. Modem UARTs are already enabled at this point.
2. Host wakes up if it was in sleep mode. Host's UARTs are enabled. Host is ready to receive data on the UARTs. Host asserts MODULE_WAKE to signal to radio processor 104 that it's ready to receive data.
3. Message transfer occurs. Multiple bi-directional messages can be exchanged.
4. After the message is terminated, there is a short hysteresis period to prevent unnecessary toggling of either of the handshake signals.
5. Modem de-asserts HOST_WAKE interrupt since it has finished all the message transfer at this point. Host can still send messages.
6. Host de-asserts MODULE_WAKE interrupt since it's done with message transfer. The communication channel is closed.
7. Both processors can enter into sleep state.

In these exemplary methods, radio processor 104 may be configured to de-assert the APP wakeup interrupt when radio processor 104 has completed transmission of the data. Also, host processor 102, in response to the wake signal, may be configured to send a signal to radio processor 104 indicating host processor 102 is ready to receive data, wherein radio processor 104 is configured to send data in response to receiving the signal. Also, host processor 102 may be configured to provide a second wake signal to radio processor 104, radio processor 104 being configured to send a second signal to host processor 102 indicating it is ready to receive second data. Host processor 102 may be configured, in response to the second signal, to send second data to radio processor through a communication port.

Figure 6:
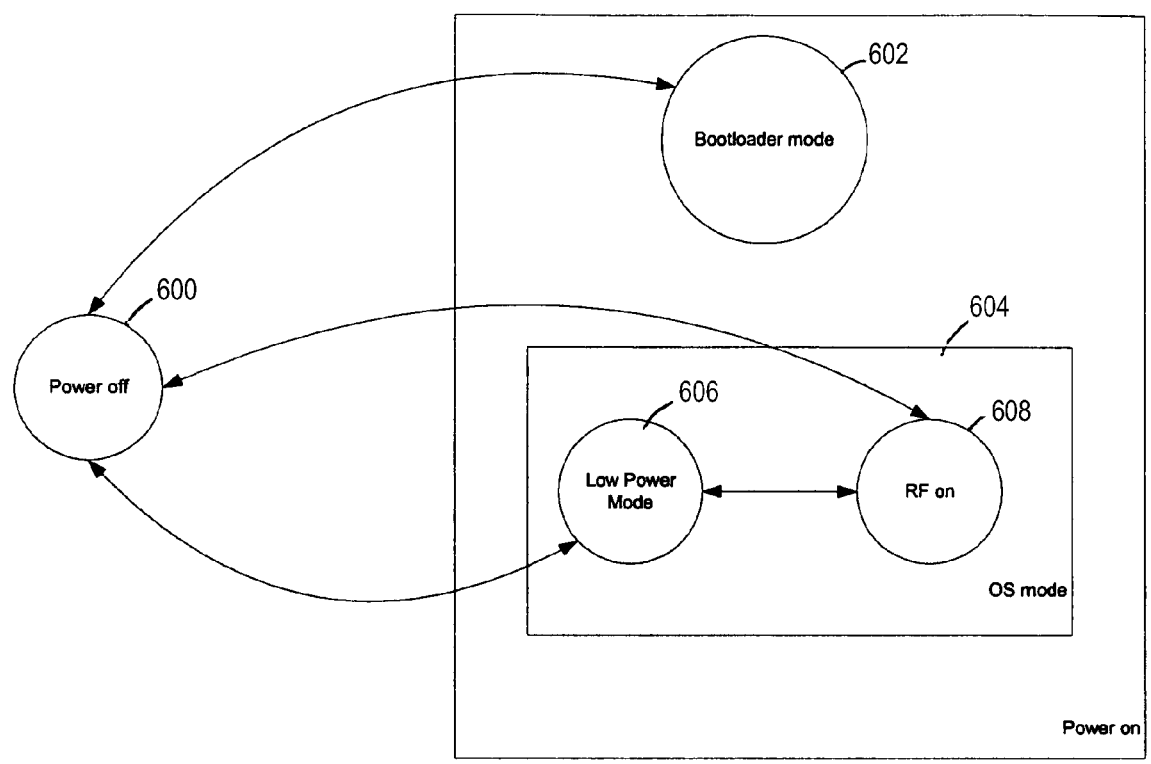
FIG. 6 is a state diagram illustrating modem states and state transitions, according to an exemplary embodiment.

Referring now to FIG. 6, radio processor 104 may have a plurality of modes or states from the host processor 102 perspective. In a Power Off state 600, power supply from host processor 102 to radio processor 104 is turned off. After power is supplied, host processor 102 can provide control signals to radio processor 104 to put radio processor 104 into a Bootloader Mode state 602 or an Operating System (OS) Mode state 604. In Bootloader Mode state 602, radio processor 104 is ready for software download. In OS Mode state 604, radio processor 104 will first go to a Low Power Mode (LPM) state 606. In LPM state 606, radio frequency functionality is turned off. In order to make voice and data calls, radio processor 104 has to be moved into RF On Mode state 608. To get radio processor 104 into RF On Mode state 608, host processor 102 sends a host controller interface (HCI) commands to radio processor 104. Host processor 102 can further be configured to take the radio processor 104 back to LPM state 606.

Figure 7:
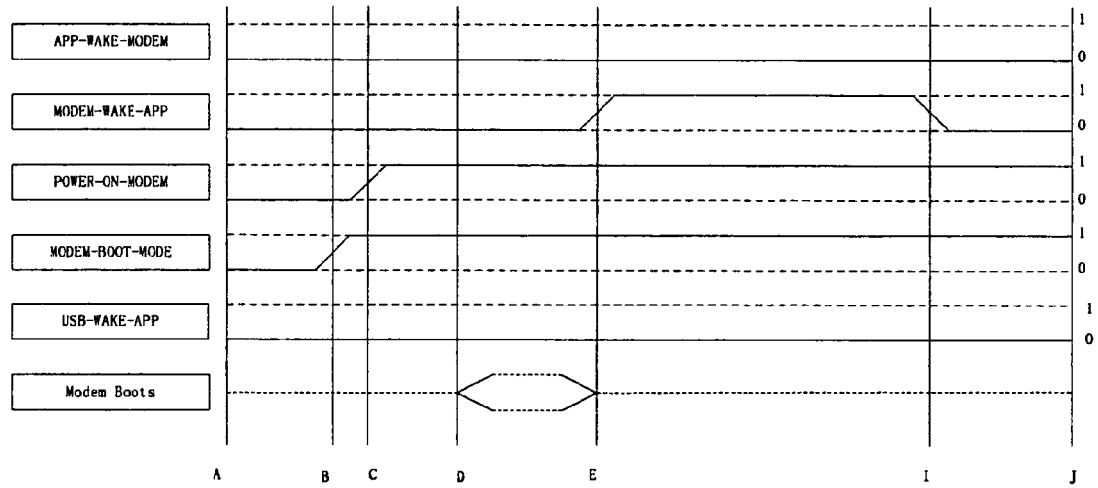
FIG. 7 is a signaling diagram illustrating a power on to bootloader mode, according to an exemplary embodiment.

Referring now to FIG. 7, a signaling diagram illustrating a Power On to Bootloader Mode function will be described. The labels in the FIGS refer the following sequence of events:
- B: Host processor 102 (APP) asserts MODEM-BOOT-MODE to indicate booting the radio processor 104 (modem) to Bootloader Mode state 602.
- C: APP pulls POWER-ON-MODEM line high.
- D: Modem start booting.
- E: Modem asserts MODEM-WAKE-APP line high to indicate to APP that modem has boot up properly.
- I: Modem de-asserts MODEM-WAKE-APP line to complete the function.

Figure 8:
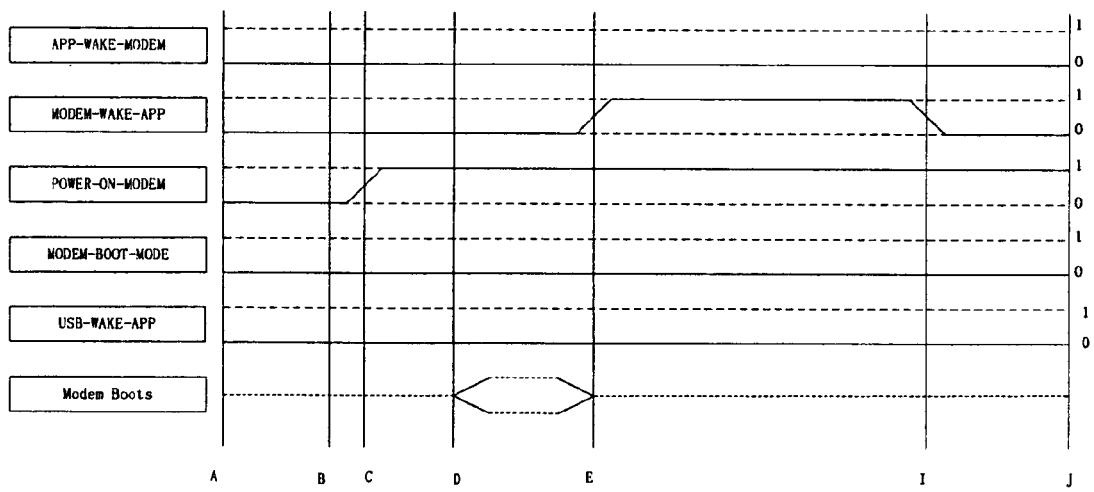
FIG. 8 is a signaling diagram illustrating a power on to operating system mode, according to an exemplary embodiment.

Referring now to FIG. 8, a signaling diagram illustrating a Power On to OS Mode function will be described.
- B: Application processor (APP) keeps MODEM-BOOT-MODE low to indicate booting radio processor 104 into OS mode.
- C: APP pulls POWER-ON-MODEM line high.
- D: Modem starts booting.
- E: Modem asserts MODEM-WAKE-APP line high to indicate to APP that the modem has boot up properly.
- I: Modem de-asserts MODEM-WAKE-APP line to complete the function.

Figure 9:
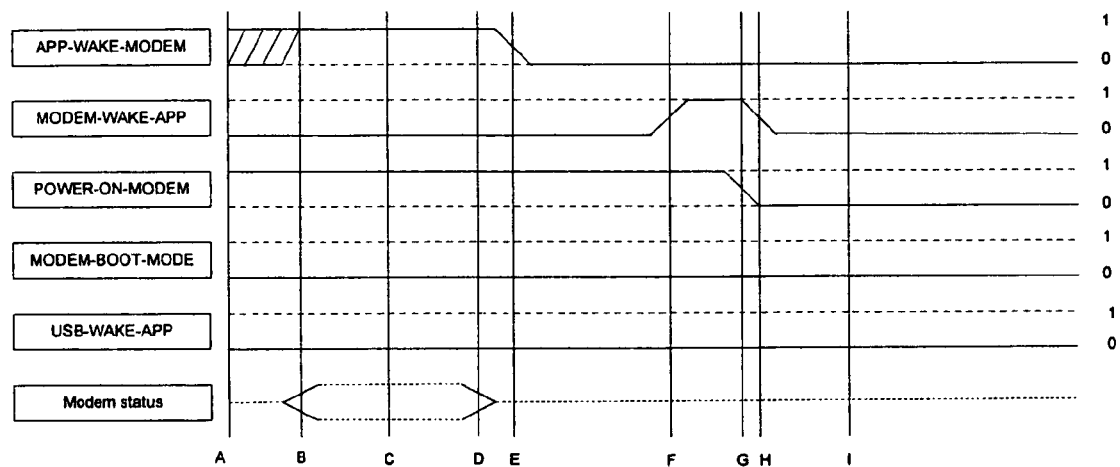
FIG. 9 is a signaling diagram illustrating a power off mode, according to an exemplary embodiment.

Referring now to FIG. 9, a signaling diagram illustrating a Power Off function will be described.
- B: APP sends 'Power Off' message to modem.
- C: Modem sends power down registration if any and enters low power mode.
- D: Modem finishes power down tasks (e.g., "house cleaning") and sends HCI message to notify APP that power down begins.
- E: APP pulls down APP-WAKE-MODE.
- F: Modem asserts MODEM-WAKE-APP when it is safe to remove power from the Modem.
- G: APP de-asserts POWER-ON-MODEM line.
- H: MODEM-WAKE-APP drops due to removing power.
- I: APP is ready for next power up sequence.

Handshaking functions may prepare host processor 102 and radio processor 104 for events or data exchange by the processors waking each other up from any low power mode they might be in. Data flow may be hardware flow controlled. For example, if host processor 102 has data to send to radio processor 104, host processor 102 asserts the APP-WAKE-MODEM line and an APP-RTS line. Radio processor 104 is configured to awaken from the sleep state in response to the APP-WAKE-MODEM line, assert an APP-CTS line to cause host processor 102 to begin transmitting data to radio processor 104. Host processor 102 is configured to handle failures of these signals. Radio processor 104 can use a similar process when it has data to send to host processor 102. APP-RTS/APP-CTS may be Request to Send/Clear To Send signals which may assist in preventing data loss.

In this exemplary embodiment, host processor 102 and radio processor 104 only enter sleep mode when both APP-WAKE-MODEM line and MODEM-WAKE-APP line are held low for a predetermined period of time and there is no data flow between the two processors. Before host processor 102 goes to sleep, it first de-asserts the APP-RTS line. Similarly, radio processor 104 de-asserts the APP-CTS line before it goes to sleep.

Figure 10:
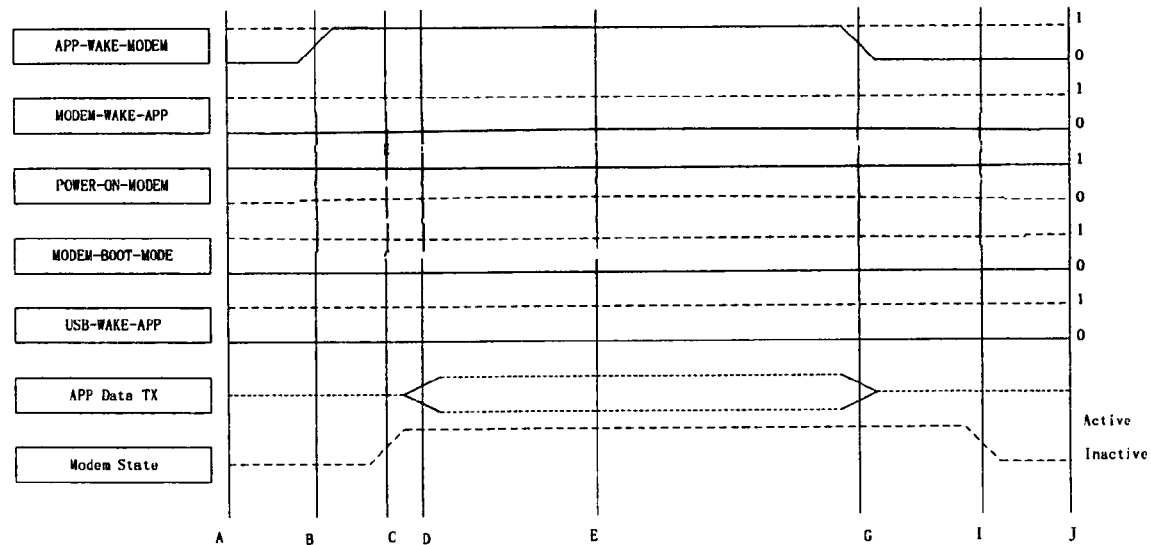
FIG. 10 is a signaling diagram illustrating a host processor initiates communication mode, according to an exemplary embodiment.

Referring now to FIG. 10, a signaling diagram illustrating a host processor initiates communication mode will be described. This process may be used when host processor 102 wishes to initiate communication with radio processor 104.
- B: APP asserts APP-WAKE-MODEM line to signal to the modem that it wishes to transfer data to the modem.
- C: Modem detects the APP-WAKE-MODEM line high.
- D: Modem enables the hardware flow control. Data flows between APP and modem.
- G: APP ends sending data. APP-WAKE-MODEM line is pulled low. No data should follow on the line, and the transmit shift register must be empty before APP-WAKE-MODEM is pulled down.
- I: Modem enters inactive state.

Figure 11:
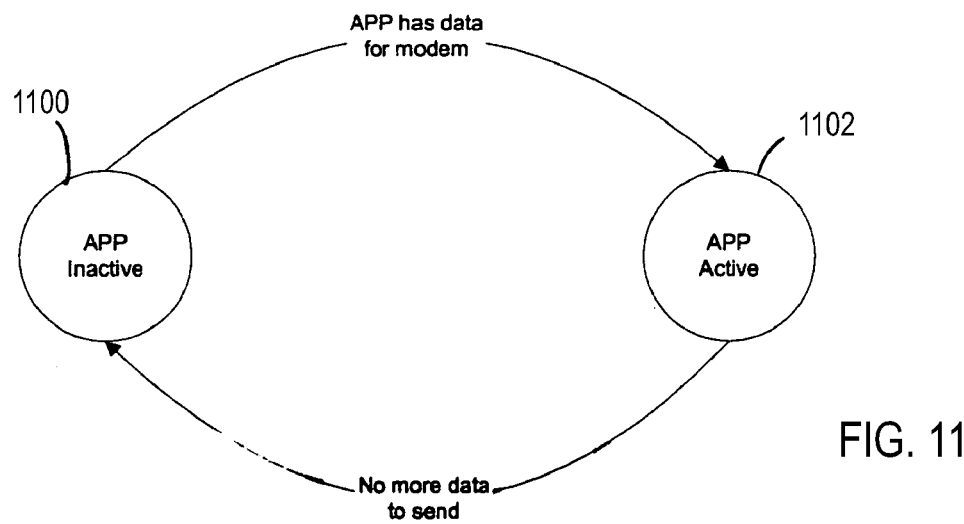
FIG. 11 is a state diagram illustrating a host processor wakes radio processor data flow from the host processor side, according to an exemplary embodiment.

Referring now to FIG. 11, a state diagram illustrating a host processor wakes radio processor data flow from the host processor side will be described. Host processor 102 may have an APP Inactive State mode 1100 in which APP-WAKE-MODEM is de-asserted or is kept low. Host processor 102 may have an APP Active State mode 1102 in which APP-WAKE-MODEM is asserted and data may be sent/received. In this exemplary embodiment, host processor 102 can transfer from APP Active State mode 1102 to APP Inactive State mode 1100 at any time. Host processor 102 may stay awake even after it de-asserts the APP-WAKE-MODEM for any period of time, known or unknown to radio processor 104.

Figure 12:
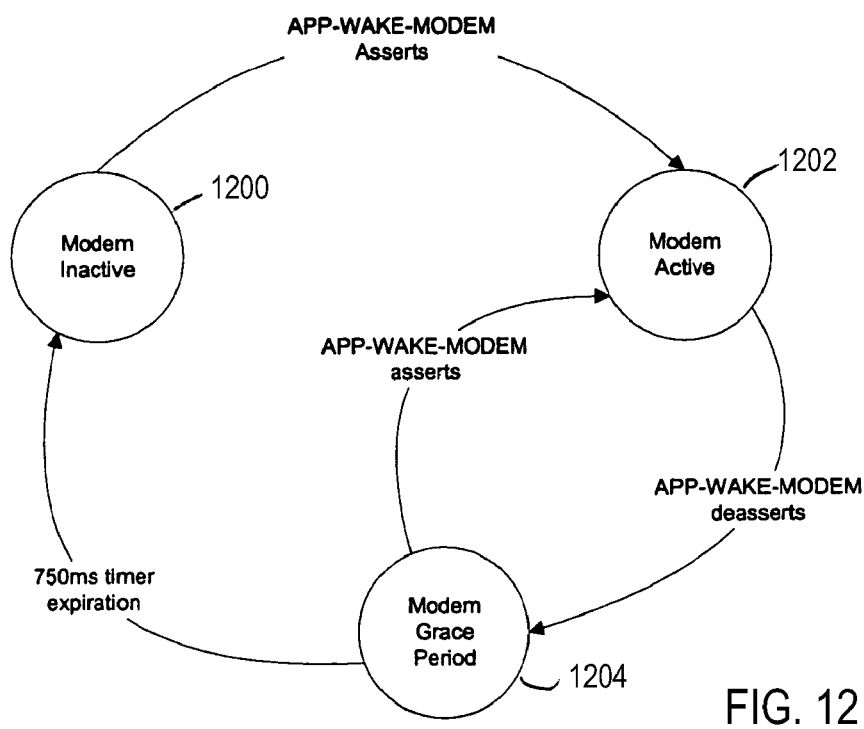
FIG. 12 is a state diagram illustrating a host processor wakes radio processor data flow from the radio processor side, according to an exemplary embodiment.

Referring now to FIG. 12, a state diagram illustrating a host processor wakes radio processor data flow from the radio processor side will be described. FIG. 12 shows a handshaking task state transition diagram for the case when host processor 102 wished to initiate communication with radio processor 104. Radio processor 104 may have a Modem Inactive State mode 1200 in which APP-WAKE-MODEM is de-asserted or is kept low, a Modem Active State mode 1202 in which APP-WAKE-MODEM is asserted and radio processor 104 wakes up and may send/receive data, and a Modem Grace Period State mode in which APP-WAKE-MODE is de-asserted and a 750 ms (or other period of time) grace period timer starts. After expiration of the 750 ms grace period timer, radio processor 104 moves to the Modem Inactive State mode 1200.

Figure 13:
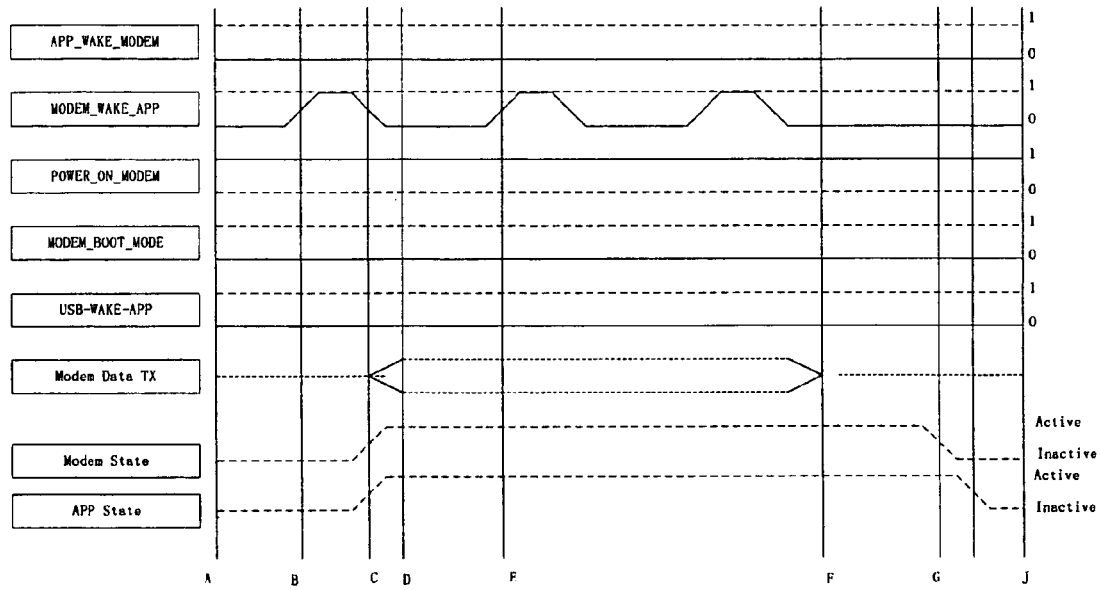
FIG. 13 is a signaling diagram illustrating a radio processor initiates communication mode, according to an exemplary embodiment.

Referring now to FIG. 13, a signaling diagram illustrating a radio processor initiates communication mode will be described.

B: Modem starts pulsing the MODEM-WAKE-APP line to signal to the APP that it wishes to transfer data to the APP. Modem asserts APP-CTS line. APP continues to assert MODEM-WAKE-APP line interrupt.

C: The APP detects the MODEM-WAKE-APP pulse. It asserts APP-RTS line and data flows between the two processors F: Modem ends sending data. MODEM-WAKE-APP pulses stop.

H: After 1 sec (or other period of time) the APP enters inactive state.

In this exemplary embodiment, radio processor 104 is configured to pulse a wakeup signal during at least a portion of a time during which the host processor 102 is receiving data from the radio processor 104. Periodic pulsing or continuously holding the wakeup signal high (or low if active low) may decrease the likelihood that host processor 102 will miss the wakeup signal, which may result in fewer missed phone calls or data updates (e.g., e-mail). For example, host processor 102 may be handling another interrupt when the first wakeup signal is received, which may cause host processor 102 to miss the wakeup signal. Alternatively, or in addition, the APP-WAKE-MODEM wakeup signal from host processor 102 to radio processor 104 may be pulsed similarly.

Figure 14:
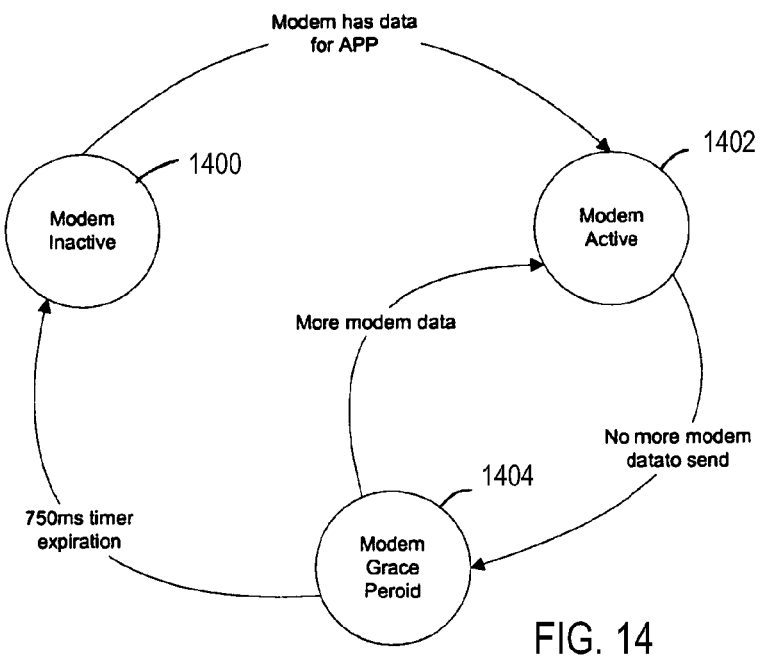
FIG. 14 is a state diagram illustrating a radio processor wakes host processor data flow from the radio processor side, according to an exemplary embodiment.

Referring now to FIG. 14, a state diagram illustrating a radio processor wakes host processor data flow from the radio processor side will be described. Radio processor 104 may have a Modem Inactive State mode 1400 in which the MODEM-WAKE-APP line is de-asserted or is kept low, a Modem Active State mode 1402 in which radio processor 104 begins pulsing MODEM-WAKE-APP line and data is sent/received, and a Modem Grace Period State mode 1404 in which radio processor 104 stops pulsing MODEM-WAKE-APP line and a one second (or other time period) grace timer starts. After the timer expires, radio processor 104 enters mode 1400.

Figure 15:
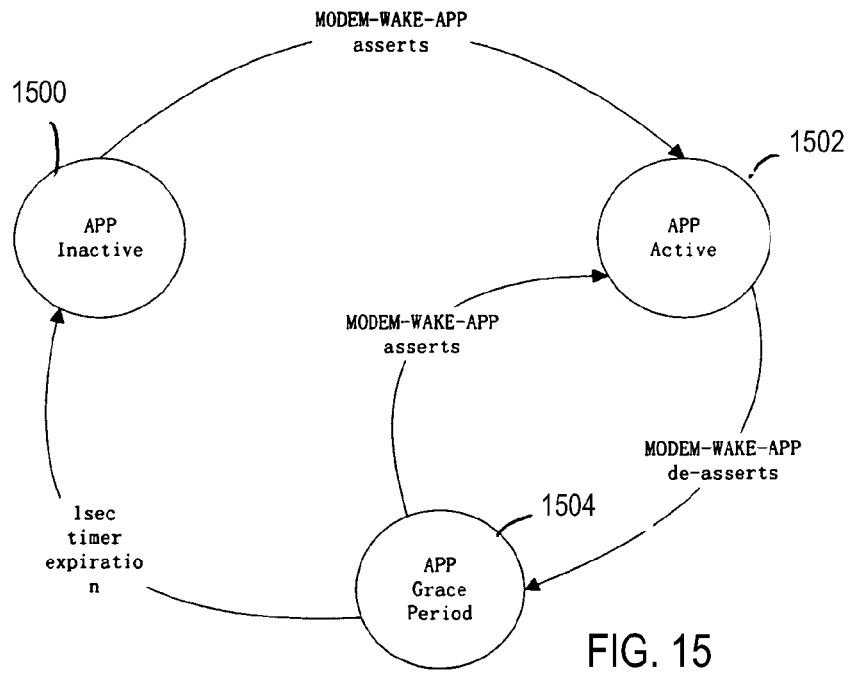
FIG. 15 is a state diagram illustrating a radio processor wakes host processor data flow from the host processor side, according to an exemplary embodiment.

Referring now to FIG. 15, a state diagram illustrating a radio processor wakes host processor data flow from the host processor side will be described. Host processor 102 may have an APP Inactive State mode 1500 in which MODEM-WAKE-APP is low, an APP Active State mode 1502 in which host processor 102 detects MODEM-WAKE-APP pulses, and an APP Grace Period State mode 1504 in which MODEM-WAKE-APP pulses are stopped and a one second (or other time period) grace timer starts. After the timer expires, radio processor 104 enters mode 1500.

Figure 16:
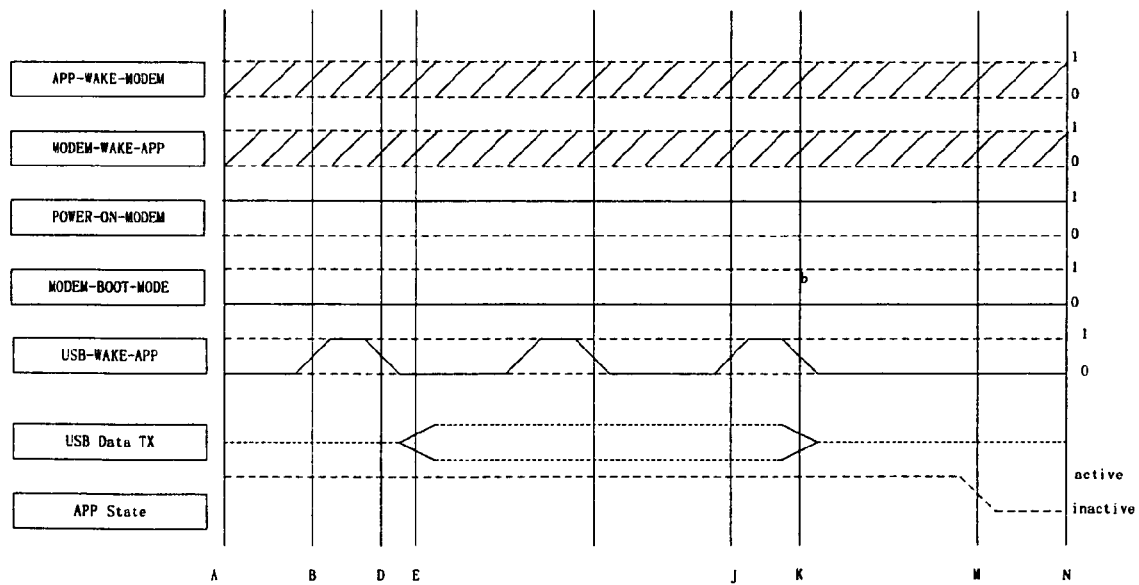
FIG. 16 is a signaling diagram illustrating a universal serial bus controller wakeup mode, according to an exemplary embodiment.

Referring now to FIG. 16, a signaling diagram illustrating a universal serial bus controller wakeup feature will be described. Host processor 102 and radio processor 104 each contain a universal serial bus controller, which may be on-chip or a separate integrated circuit associated with the respective processor. The host USB controller is coupled to host processor 102 and is configured to provide USB communication over a universal serial bus (USB) with radio processor 104. The radio USB controller is coupled to radio processor 104 and is configured to proved USB communication over the USB with host processor 102.

FIG. 16 shows the signaling used when radio processor 104 wishes to wake up the USB controller on host processor 102. USB-WAKE-APP would be a USB remote wake up message (or a general purpose input/output GPIO signal) asserted when USB is in suspend or off states and data needs to be sent from radio processor 104 to host processor 102. In response to receiving USB-WAKE-APP, host processor 102 commands its USB controller to enter an on state to allow USB controller to receive data from radio processor 104.

B: Modem starts pulsing the USB-WAKE-APP line to signal to the APP that it wishes to transfer data to the APP.

E: The APP detects the USB-WAKE-APP pulses. APP activates USB. Data transfer begins.

K: Modem ends sending data. USB-WAKE-APP pulses stop.

M: After 750 ms to 1s (or other time period) the APP enters inactive state.

Advantageously, at least one of the USB controllers on host processor 102 and radio processor 104 has off, suspend, and on states. Suspend state may be a state in which USB controller operates at lower power than the on state, yet can be moved to the on state more quickly than from the off state. In suspend state, the USB controller does not drive the USB, but is not in an off state. Suspend state may be as defined by a Universal Serial Bus specification. A USB controller may move to a suspend state after a predetermined period of inactivity. Host processor 102 may be moved to a wake state before host processor 102 moves host USB controller among on, suspend, and suspend states. After moving host USB controller to a new state, host processor 102 may return to a sleep state and host USB controller will remain in its new state.

According to one exemplary embodiment, after host USB controller processes a message on the universal serial bus, the universal serial bus controller is configured to enter the off state while host processor 102 is in a sleep state. By moving host USB controller to an off state (instead of a suspend state or leaving in an on state), power consumption can be reduced (e.g., 600 uA in one exemplary embodiment). Conventional USB usage in, for example, a personal computer provides that USB controllers are routinely left in suspend state because of a lesser need to conserve power.

Advantageously, the universal serial bus controller is further configured to move from the off state to the on state without enumerating, in order to save time.

According to another exemplary embodiment, a serial communication bus (e.g., UART) controller coupled to host processor 102 may have an on state and an off state, wherein the USB controller on host processor 102 is configured to be put in the off state when the serial communication bus controller is in the on state. For example, if a particular type of data received at radio processor 104 may be communicated to host processor 102 via the serial communication bus, USB need not be move to the on or wake state. For example, a USB may be used for packet data (e.g., wireless synchronizing of e-mails, streaming video, internet browsing, etc.), diagnostic logging from modem, and sending debug messages.

According to one example, a mobile computing device 10 has been activated with a network and registered with a service provider. When radio processor 104 receives incoming data, it knows host processor 102 is in sleep mode and host USB controller is off. Radio processor 104 moves its own radio USB controller to an on/wake state. Radio processor 104 provides a signal over a GPIO (e.g. MODEM-WAKE-APP) to wake up host processor 102. Radio processor 104 then sends an HCI message to tell host processor 102 to power host USB controller to an on/wake state, before sending any data. Host processor 102 wakes up and provides a USB clock signal to radio USB controller. The data is then communicated from radio processor 104 to host processor 102.

Alternatively, UART hardware flow control lines may be used for the host processor wake up signal and a dedicated GPIO may be used to wake up the host USB controller. In this embodiment, both host and radio processor may reconfigure a pin to general GPIO when host processor 102 is sleeping. Further, an HCI message could be send from the host to the radio processor just before the host processor enters sleep mode. Radio process may not acknowledge this message. As a further alternatively, the bootloader line may be multiplexed to act as a wakeup line.

Figure 17:
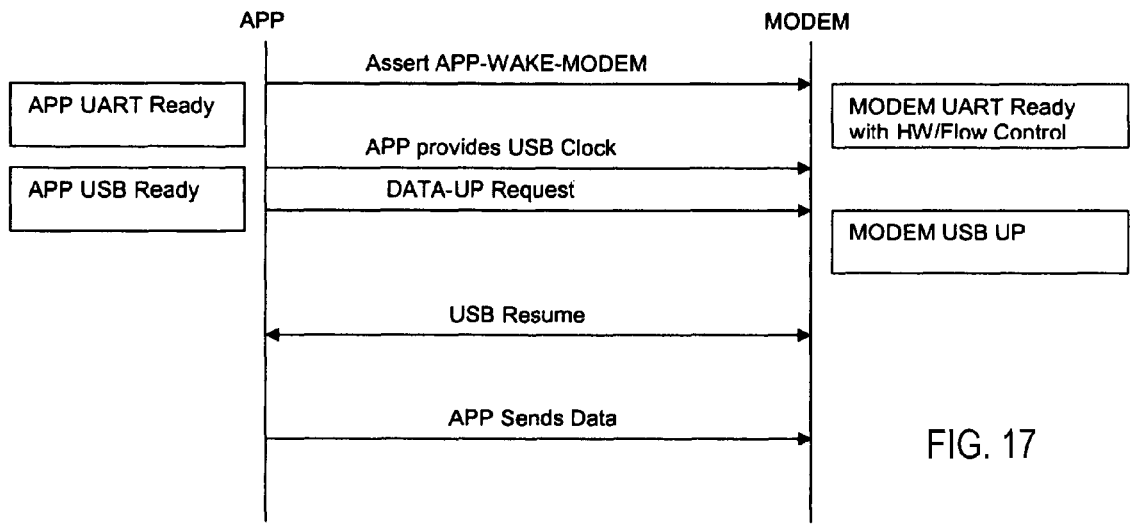
FIG. 17 is a flow diagram illustrating a universal serial bus controller wakeup mode, according to an exemplary embodiment.

Referring now to FIG. 17, a flow diagram illustrates a universal serial bus controller wakeup mode, according to an exemplary embodiment. In this flow diagram, a mobile originated data call process is illustrated. Host and radio processors 102, 104 can be configured to send the following HCI messages to the other:

DATA-DOWN: APP sends this HCI message to the MODEM when the APP is about to sleep. This message updates the MODEM state so that the MODEM will send the DATA-UP message if there are any more data activities involving the APP.

DATA-UP: MODEM sends this HCI message if the MODEM received the DATA-DOWN message before and there are data activities which require APP attention. This message should send to the telephone interface layer (TIL) software on host processor 102 and host processor 102 will power the host USB controller to receive data packets.

Host processor 102 shall setup the host USB controller and send the DATA-UP to wake up the radio USB controller. Host processor 102 first wakes up the radio processor 104 by APP-WAKE-MODEM pin to bring up the UART communication for HCI. Host processor 102 provides the USB clock signal after the radio USB controller is powered up before any USB control commands or data are sent over the USB. In this embodiment, USB re-enumeration is not required.

Figure 18:
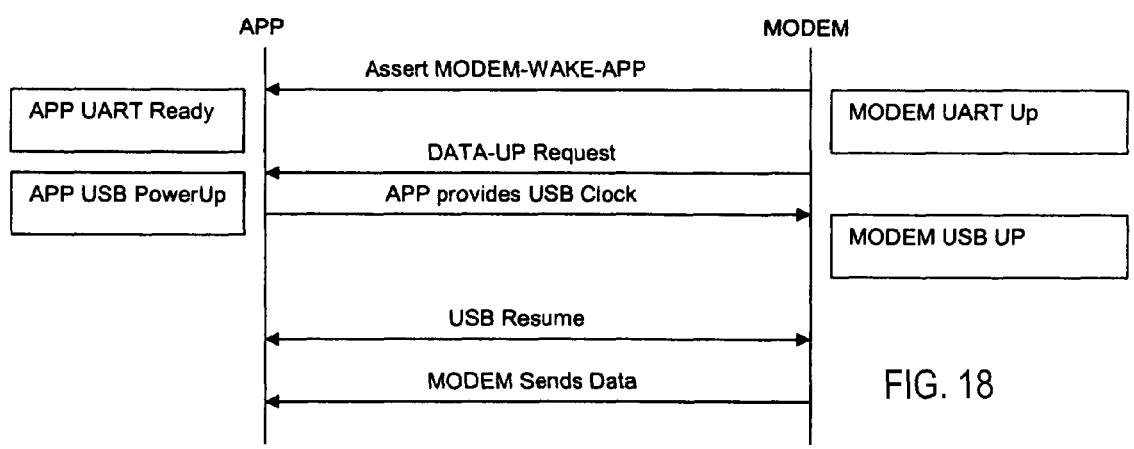
FIG. 18 is a flow diagram illustrating a universal serial bus controller wakeup mode, according to an exemplary embodiment.

Referring now to FIG. 18, a mobile terminated data call function is disclosed. When there is incoming data from the network while a call is inactive, the network will page the device to setup a traffic channel for receiving the data. Radio processor 104 will forward this page message to the host and the host may intercept this page message and turn on the host USB controller. Host processor 102 is configured to handle this event even it is in the process of entering sleep state.

Figure 19:
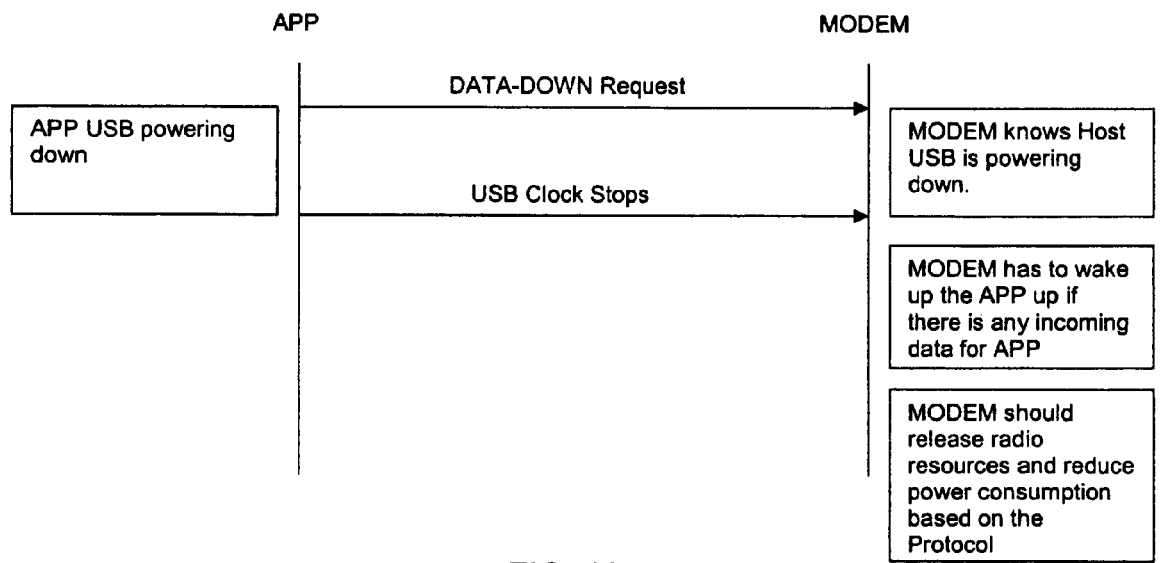
FIG. 19 is a flow diagram illustrating a universal serial bus controller sleep mode, according to an exemplary embodiment.

Referring to FIG. 19, a host processor entering sleep mode function is disclosed. Host processor 102 may check the MODEM-WAKE-APP signal before entering sleep state. If host processor 102 decides to enter sleep mode, it is configured to send the HCI message to radio processor 104. If there is any more incoming data, radio processor 104 is configured to wake up the APP with an APP wakeup procedure described above, including sending the DATA-UP message to the host for moving the USB controller to an on/wake state.

According to another embodiment, mobile computing device 10 is configured to communicating with a network, the network of a type configured to release a channel of communication with a device after expiration of a timer (e.g., 10 to 20 seconds, or other time period). CDMA is an example of such a network. Radio processor 104 is configured to provide wireless communication over the network and to enter a sleep mode before expiration of the timer. Radio processor 104 can be configured to enter the sleep mode in response to a sleep signal (e.g., message, interrupt, etc.) from host microprocessor 102, or it may put itself into a sleep mode based on one or more criteria (e.g., absence of data being received over the wireless network). Radio processor 104 may be configured to enter the sleep mode in response to a signal indicating the host processor 102 is entering a sleep state.

One of the concepts in CDMA/IS-2000 is data dormancy. Any active data call in IS-2000 requires the mobile device to setup a traffic channel between the base station controller and the mobile device. Typical dormancy is network timer driven, the network operator configured to request dormancy of the mobile device based on a timer for inactivity of data.

In this embodiment, mobile computing device 10 is configured to enter without waiting for the expiration of the timer. Dormancy may relate to moving radio processor 104 to a sleep state. Dormancy may relate to releasing an active data call between device 10 and the network, while optionally maintaining a paging channel such as SMS or packet data. Mobile computing device 10 may requests the network to release radio resources on the traffic channel when device 10 does not expect any data activity to happen. Device 10 or some portion thereof (e.g., radio processor 104) may then enter sleep mode once the traffic channel is released.

In one exemplary embodiment, the host processor 102 is responsible for initiating the fast dormancy based on the data connectivity between processors 102 and 104. Host processor 102 is configured to send an HCI message to radio processor 104 before entering sleep mode. Radio processor 104 does not acknowledge this HCI message because host processor 102 may have entered sleep state already and host processor 102 is preferably not awakened unnecessarily. If there is any incoming data from the network that has to be send to host processor 102, radio processor 104 will wake up host processor 102 with exemplary wakeup procedures shown above.

In one embodiment, radio processor 104 may respond to the DATA-DOWN message as a trigger for requesting fast dormancy and radio processor 104 may generate the DATA-UP message based on an EVDO paging message before the incoming data arrives from the traffic channel.

While the exemplary embodiments illustrated on the Figs. and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A mobile computing device, comprising:
   a first microprocessor configured to operate a plurality of applications and having a sleep mode and a wake mode;
   a second microprocessor configured to provide wireless communication over a network;
   a universal serial bus; and
   a universal serial bus controller having on, off and suspend states, the universal serial bus controller coupled to the first microprocessor and configured to provide universal serial bus communication with the second microprocessor, wherein after processing a message on the universal serial bus, the universal serial bus controller is configured to enter the off state while the first microprocessor is in a sleep state; and
   a serial communication bus controller coupled to the first microprocessor, the serial communication bus controller having an on state and an off state, wherein the universal serial bus controller is configured to be put in the off state when the serial communication bus controller is in the on state.

2. The mobile computing device of claim 1, wherein the universal serial bus controller is configured to move from the off to the on state without enumerating.

3. The mobile computing device of claim 1, wherein the first and second microprocessors are part of a dual core chip.

4. The mobile computing device of claim 1, wherein the second microprocessor has a sleep mode and a wake mode.

5. The mobile computing device of claim 1, wherein the second microprocessor is a modem.

6. A mobile computing device comprising:
a first microprocessor configured to operate a plurality of applications and having a sleep mode and a wake mode;
a second microprocessor configured to provide wireless communication over a network;
a universal serial bus; and
first controller means having on, off and suspend states, the first controller means for providing communication between the first microprocessor and the second microprocessor, wherein after processing a message, the first controller means is configured to enter the off state while the first microprocessor is in a sleep state; and
second controller means having an on state and an off state, the second controller means for providing communication between the first microprocessor and the second microprocessor;
wherein the first controller means is configured to be put in the off state when the second controller means is in the on state;
wherein the first controller means is a universal serial bus controller means;
wherein the second controller means is a serial communication bus controller means.

7. The mobile computing device of claim 6, wherein the first controller means is configured to move from the off state to the on state without enumerating.

8. The mobile computing device of claim 6, wherein the first and second microprocessors are part of a dual-core integrated circuit.

9. The mobile computing device of claim 6, wherein the second microprocessor has a sleep mode and a wake mode.

10. The mobile computing device of claim 6, wherein the second microprocessor is a modem.

11. A method comprising:
processing a message on a universal serial bus using a universal serial bus controller, the universal serial bus controller having on, off and suspend states, the universal serial bus controller coupled to a first microprocessor and configured to provide universal serial bus communication with a second microprocessor;
putting the universal serial bus controller in the off state while the first processor is in a sleep state after processing the message on the universal serial bus; and
putting a serial communication bus controller in an off state when the universal serial bus controller is in the on state, the serial communication bus controller being coupled to the first microprocessor, the serial communication bus controller having an on state and the off state.

12. The method of claim 11, wherein the first microprocessor is configured to operate a plurality of applications.

13. The method of claim 11, wherein the second microprocessor is configured to provide wireless communication over a network.

14. The method of claim 11, wherein the first and second microprocessors are part of a dual core chip.

15. The method of claim 11, wherein each of the first and second microprocessors has a sleep mode and a wake mode.

* * * * *